(12) United States Patent
O'Callaghan (10) Patent No.: US 7,561,214 B1
(45) Date of Patent: Jul. 14, 2009

(54) TWO-DIMENSIONAL NAVIGATION OF MULTIPLEXED CHANNELS IN A DIGITAL VIDEO DISTRIBUTION SYSTEM

(75) Inventor: Daniel O'Callaghan, Fairfax Station, VA (US)

(73) Assignee: Bell Atlantic Entertainment Group and Information Services Group, Inc., New York, NY (US)

( * ) Notice: Subject to any disclaimer, the term of this patent is extended or adjusted under 35 U.S.C. 154(b) by 0 days.

(21) Appl. No.: 08/963,944

(22) Filed: Nov. 4, 1997

(51) Int. Cl.
*H04N 5/50* (2006.01)
*H04N 5/44* (2006.01)

(52) U.S. Cl. .................. 348/731; 348/569; 348/734

(58) Field of Classification Search .......... 348/563, 348/564, 569, 589, 906, 6, 7, 134, 460, 570, 348/731, 734, 732, 733; 455/3.2, 6.2, 6.3, 455/158.5, 3.02; 358/146; 345/329; 364/514 R; 725/38, 39, 48, 57, 59; *H04N 5/50, 5/44*
See application file for complete search history.

(56) References Cited

U.S. PATENT DOCUMENTS

| | | | | |
|---|---|---|---|---|
| 5,152,012 A | * | 9/1992 | Schwob | 455/158.5 |
| 5,200,823 A | * | 4/1993 | Yoneda et al. | 358/146 |
| 5,301,028 A | * | 4/1994 | Banker et al. | 348/570 |
| 5,585,866 A | * | 12/1996 | Miller et al. | 348/731 |
| 5,594,509 A | * | 1/1997 | Florin et al. | 348/731 |
| 5,703,795 A | * | 12/1997 | Mankovitz | 364/514 R |
| 5,790,198 A | * | 8/1998 | Roop et al. | 348/460 |
| 5,793,366 A | * | 8/1998 | Mano et al. | 345/329 |
| 5,793,438 A | * | 8/1998 | Bedard | 348/569 |
| 5,883,680 A | * | 3/1999 | Nykerk | 348/734 |
| 5,894,320 A | * | 4/1999 | Vancelette | 348/7 |
| 5,978,043 A | * | 11/1999 | Blonstein et al. | 348/569 |
| 5,982,411 A | * | 11/1999 | Eyer et al. | 348/6 |
| 6,249,320 B1 | * | 6/2001 | Schneidewend et al. | 348/569 |

\* cited by examiner

*Primary Examiner*—Sherrie Hsia (57) ABSTRACT

Two-dimensional channel navigation techniques for use in a video distribution system in which broadcast providers each transmit an anchor channel. Some of the broadcast providers may transmit the anchor channel as a single HDTV channel, while the others transmit a set of multiplexed channels including an anchor channel and one or more associated multiplex channels. A receiver which receives the anchor channels and any associated multiplex channels generates an on-screen display which indicates to a viewer the multiplex channels, if any, associated with a currently-selected anchor channel. The on-screen display includes a multiplex indicator with a series of icons, each of the icons representing a particular one of the multiplex channels associated with the currently-selected anchor channel. Each of the icons may be configured to provide an indication of the program content which may be found on the associated multiplex channel. The viewer presses channel right or channel left keys on a remote control or other channel selection device to sequence horizontally through the multiplex channels associated with the selected anchor channel, and uses channel up and down keys to sequence vertically through the anchor channels of the various broadcast providers.

17 Claims, 6 Drawing Sheets

FIG. 1

| 5 FOX | NAACP IMAGE AWARDS | | |
| --- | --- | --- | --- |
| ↔ NEWS | NEWS | SPECIAL REPORT | |
| ↔ MOVIES | STAR WARS | | |
| ↔ SPORTS | NBA BASKETBALL | | |
| | | | |
| 9 CBS | DIAGNOSIS MURDER | DANGEROUS ANIMALS | |

TWO-DIMENSIONAL NAVIGATION OF MULTIPLEXED CHANNELS IN A DIGITAL VIDEO DISTRIBUTION SYSTEM

FIELD OF THE INVENTION

The present invention relates generally to digital video distribution systems, and more particularly to techniques for facilitating user selection of viewing channels in a distribution system supporting a large number of available channels.

BACKGROUND OF THE INVENTION

Digital video distribution systems are designed to deliver large numbers of program channels from a central location to the televisions, computers or set top boxes of remote viewers. The number of available channels has increased dramatically in recent years, as more sophisticated distribution systems have come into widespread use. A typical system provides a viewer with as many as one hundred or more channels to select from at any given time. This can create a serious inconvenience for a viewer who is attempting to find a program of interest. Simply sequencing through all available channels, although an acceptable approach for systems with a limited number of channels, has become increasingly tedious and time-consuming as the number of available channels has proliferated.

The current method of selecting and identifying program channels in most systems remains tightly coupled to the carrier frequency on which the channel is sent. Furthermore, each frequency generally supports only a single channel. Broadcasts in the Very High Frequency (VHF) band, for example, utilize 8 MHz channels which are sequentially numbered 1, 2, 3 . . . etc. During the fifty years that these channels have been used for television broadcasts, the station operators have invested a great deal of money and effort to build a brand identity for their station based on the channel number that the station operates on. Naturally, broadcasters will want to maintain their channel identity even after a switch to a new digital television standard. The advent in the United States of the Advanced Television Standard based on digital video distribution brings a number of complications to current channel selection techniques. First, the band used for digital television will be the UHF band with channel numbers 30 through 60. Second, each digital broadcast channel can support a single high definition television (HDTV) channel or multiple standard definition broadcast channels. Mapping the VHF channel number to the higher UHF channel number involves only a standard look-up table, and can therefore be easily implemented. A significant problem arises, however, when the digital broadcast channel includes a multiplex of several channels instead of a single HDTV channel. A further complication is the fact that the makeup of service on a given channel will generally vary as a function of time during normal operation. Currently available techniques will not permit viewers to access these channels in a straightforward and convenient manner, and will not allow broadcasters to maintain a channel identity while keeping their multiplexed channel offerings grouped together.

In a one-dimensional channel navigation technique proposed by General Instrument (GI) to the Advanced Television Standard Committee (ATSC), when a given "anchor" channel contains a multiplex of several channels, the "extra" or multiplex channels will be mapped to a linear sequence of numbers above the range currently utilized for other anchor channels. For example, if the FOX network operated channel 5 as a multiplex of several channels, channel 5 would be an anchor channel accessed in the conventional manner, but the remaining multiplex channels would be mapped to a linear sequence of much higher numbers beyond the range of the frequency-based anchor channel numbers.

The problem with this one-dimensional linear mapping technique is that preserving the groupings of channels that originate from the same broadcast providers will produce a confusing channel change scenario. Consider as an example the existing channel structure in the Washington, D.C. area, in which channel 4 is NBC, channel 5 is FOX, channel 7 is ABC and channel 9 is CBS. Assume for the moment that channels 4 and 5 are transmitting a single HDTV broadcast, and that ABC is transmitting a multiplex of four standard definition TV broadcasts. In accordance with the GI proposal, is a user were on NBC channel 4, and pressed the channel up key on his or her remote control, the user would move to FOX channel 5. Pressing the channel up key again would move the user to channel 7, the anchor ABC channel. Pressing the channel up key again moves the user to, for example, channel 101, which is the higher "virtual" channel to which the second channel of the ABC multiplex was mapped. Another press of the channel up key would bring the user to channel 102, followed by channel 103, the last channel of the four-channel ABC multiplex. Upon the next channel up command, the user moves from the ABC multiplex to CBS channel 9. In summary, the above-described series of channel up commands would yield the following sequence of channel presentations: 4⇒5⇒7⇒101⇒102⇒103⇒9. Such a sequence, in which the channel numbers can jump from high to low and back again, is likely to be confusing for many users. These and other one-dimensional techniques are unable to provide convenient user channel navigation while preserving channel branding for multiplex channels from the same provider.

It is therefore an object of the present invention to provide a channel navigation technique that preserves the existing branding investment broadcast providers have made in channel numbers, while also preserving the current user concept of channel numbers and providing efficient access to multiplexed channels originating from a common broadcast provider.

SUMMARY OF THE INVENTION

The present invention provides a two-dimensional channel navigation technique in which a channel up or down key is used to allow a viewer to sequence vertically through anchor channels of a number of different broadcast providers, while a channel right or left key is used to allow the viewer to sequence horizontally through one or more multiplex channels associated with a given anchor channel from a given broadcast provider.

An illustrative embodiment of the invention is implemented in a receiver of a video distribution system in which broadcast providers, such as the networks ABC, NBC and CBS, each transmit an anchor channel. Some of the broadcast providers may transmit the anchor channel as a single high definition television (HDTV) channel, while the others transmit a set of multiplexed channels including an anchor channel and one or more associated multiplex channels. The receiver which receives the anchor channels and any associated multiplex channels generates an on-screen display. The on-screen display includes an anchor channel identifier which identifies the broadcast provider supplying the currently-selected anchor channel and any corresponding multiplex channels. The on-screen display also includes a multiplex indicator which indicates that the currently-selected anchor channel includes one or more multiplex channels. The multiplex indicator includes a series of icons, with each of the icons representing a particular one of the multiplex channels associated with the currently-selected anchor channel. Moreover, each of the icons may be configured to provide an indication of the program content on the associated multiplex channel. The viewer presses channel right or channel left keys on a remote control or other channel selection device to sequence horizontally through the multiplex channels associated with the currently-selected anchor channel, and uses channel up and down keys to sequence vertically through the anchor channels of the various broadcast providers. This provides the viewer with convenient and efficient two-dimensional access to multiplex channels in a video distribution system.

The icons used in the on-screen display may be selected from an industry standard set of icons used by all broadcast providers supplying channels over the system, such that the icons will be easily recognizable to the viewer as being associated with a particular type of program. For example, a movie camera icon may be used to indicate that the program content of the corresponding multiplex channel is a movie, while a baseball may be used to indicate that the program content of the corresponding multiplex channel is a baseball game. Different colors may be used in the on-screen display to differentiate a selected multiplex channel from the remaining unselected multiplex channels. The icon of a selected multiplex channel may also be replaced in the on-screen display with a descriptive title indicative of the program content of that channel. In addition, the on-screen display may provide additional information, such as an indication of the geographic area of a broadcast provider supplying the currently-selected anchor channel and its associated multiplex channels. Furthermore, the on-screen display may be implemented as part of or in conjunction with an electronic programming guide which provides more specific information about channel program content.

The invention provides a two-dimensional channel selection technique which, through the use of both horizontal and vertical navigation, preserves broadcast provider investment in branding of channel numbers, while at the same time preventing the viewer confusion associated with the above-described one-dimensional linear mapping approach. The implementation and arrangement of multiplex channels with a given anchor channel is generally controlled by the broadcast provider, and the invention can therefore be implemented without any coordination among different broadcast providers. Various embodiment of the invention may be implemented using non-optional components of the Advanced Television Systems Committee (ATSC) standard. These and other features and advantages of the present invention will become more apparent from the accompanying drawings and the following detailed description.

DETAILED DESCRIPTION OF THE INVENTION

The present invention will be illustrated below in conjunction with an exemplary digital video distribution system. It should be understood, however, that the disclosed techniques are suitable for use with a wide variety of other systems and in numerous alternative channel navigation applications, including, for example, multichannel multipoint distribution service (MMDS), direct broadcast satellite (DBS), digital video broadcast (DVB), switched digital video (SDV), hybrid fiber/coax (HFC) and digital subscriber loop (DSL). The term "anchor channel" as used herein refers generally to a channel of a video distribution system which has at least one other channel associated therewith. The other channel or channels associated with a given anchor channel are referred to herein as "multiplex channels." An anchor channel and its corresponding multiplex channels may originate from a common broadcast provider. The term "broadcast provider" is intended to include a broadcaster, a television network, a network affiliate station or set of stations, a cable or satellite television station or stations, as well as any other entity or group which generates a set of programs for delivery to viewers over multiplexed channels. The term "receiver" as used herein is intended to include not only television receivers, but also computers, set top boxes or any other video signal processing and display device. The invention is suitable for use with video signals in a variety of formats, including HDTV systems which utilize MPEG for video and Dolby AC-3 for audio, and digital video broadcast (DVB), which utilizes MPEG for both audio and video. The following description makes use of information which can be found in the following standards documents, which are incorporated by reference herein: Program Guide for Digital Television ATSC Standard, Advanced Television Systems Committee, Document A/55, Jun. 3, 1996; System Information for Digital Television ATSC Standard, Advanced Television Systems Committee, Document A/56, Jun. 3, 1996; and ISO/IEC JTC1/SC29VWG11, Coding of Moving Pictures and Associated Audio, 13818-1, Systems.

Figure 1:
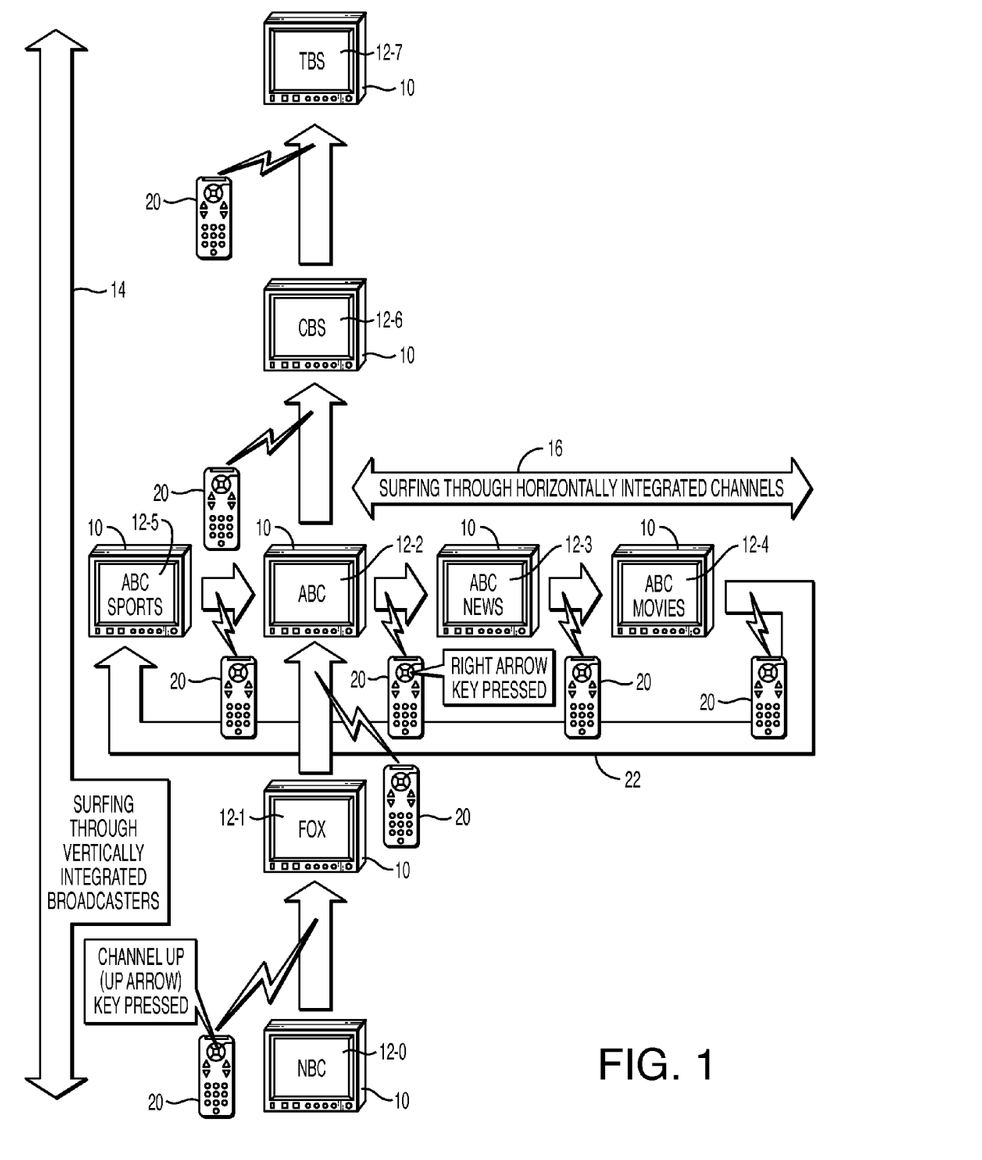
FIG. 1 illustrates an exemplary two-dimensional channel navigation technique in accordance with the invention.

FIG. 1 illustrates the operation of a two-dimensional channel navigation technique in accordance with one embodiment of the invention. A television receiver 10 is shown at different times during a channel selection process and therefore with different displays 12-$i$, $i$=1, 2, . . . N, where N is seven in this example. The arrow 14 indicates the direction of movement between different displays when a viewer is navigating or "surfing" through vertically integrated broadcast providers, and the arrow 16 indicates the direction of movement between different displays when a viewer is surfing through horizontally integrated channels corresponding to multiplex offerings of a signal broadcast provider. The use of both vertical and horizontal channel selection in accordance with the invention provides a two-dimensional channel selection technique which, as will be apparent from the following description, preserves broadcast provider investment in branding of channel numbers while preventing the viewer confusion associated with the above-described one-dimensional linear mapping approach. The viewer moves through the vertically integrated channels by pressing channel up or down keys on a remote control 20, and moves through the horizontally integrated channels by pressing channel right or left keys on the remote control 20. A similar channel selection device incorporated into the receiver 10 may also be used to provide channel selection. An illustrative channel navigation sequence produces the sequence of displays 12-0 through 12-7 as shown.

The channel sequence starts with display 12-0, which in this example corresponds to a primary or anchor channel of broadcast provider NBC. The viewer then presses the channel up key, also referred to as an up arrow, on the remote 20. This moves the viewer to the next anchor channel, which in this example is broadcast provider FOX, as shown in display 12-1. The viewer again pressed the channel up key to move to the next anchor channel following FOX, which is broadcast provider ABC as shown in display 12-2. It is assumed for this example that ABC is transmitting a multiplex of four channels, including the primary or anchor ABC channel, an ABC News channel, an ABC Movies channel, and an ABC Sports channel. Some or all of the other broadcast providers, such as NBC and FOX, could also be transmitting multiplex channels. The viewer then decides to move through the horizontally integrated multiplex channels associated with broadcast provider ABC. The viewer therefore presses the channel right key on the remote 20, producing display 12-3 which corresponds to ABC News. Pressing the channel right key a second time yields the display 12-4, which corresponds to ABC Movies. Pressing the channel right key a third time produces the display 12-5, corresponding to ABC Sports. Finally, pressing the channel right key a fourth time returns the viewer to display 12-2, corresponding to the ABC anchor channel. At this point, the viewer has passed through all of the ABC multiplex channels, and decides to resume conventional surfing through vertically integrated broadcast providers. The viewer therefore presses the channel up key, resulting in display 12-6 corresponding to broadcast provider CBS. Another press of the channel up key produces the display 12-7, corresponding to broadcast provider TBS. As noted above, any or all of the broadcast providers could be transmitting multiplex channels, and the viewer could use the horizontally integrated channel surfing illustrated for broadcast provider ABC in FIG. 1 to access the multiplex channel offerings of other broadcast providers.

Figure 2:
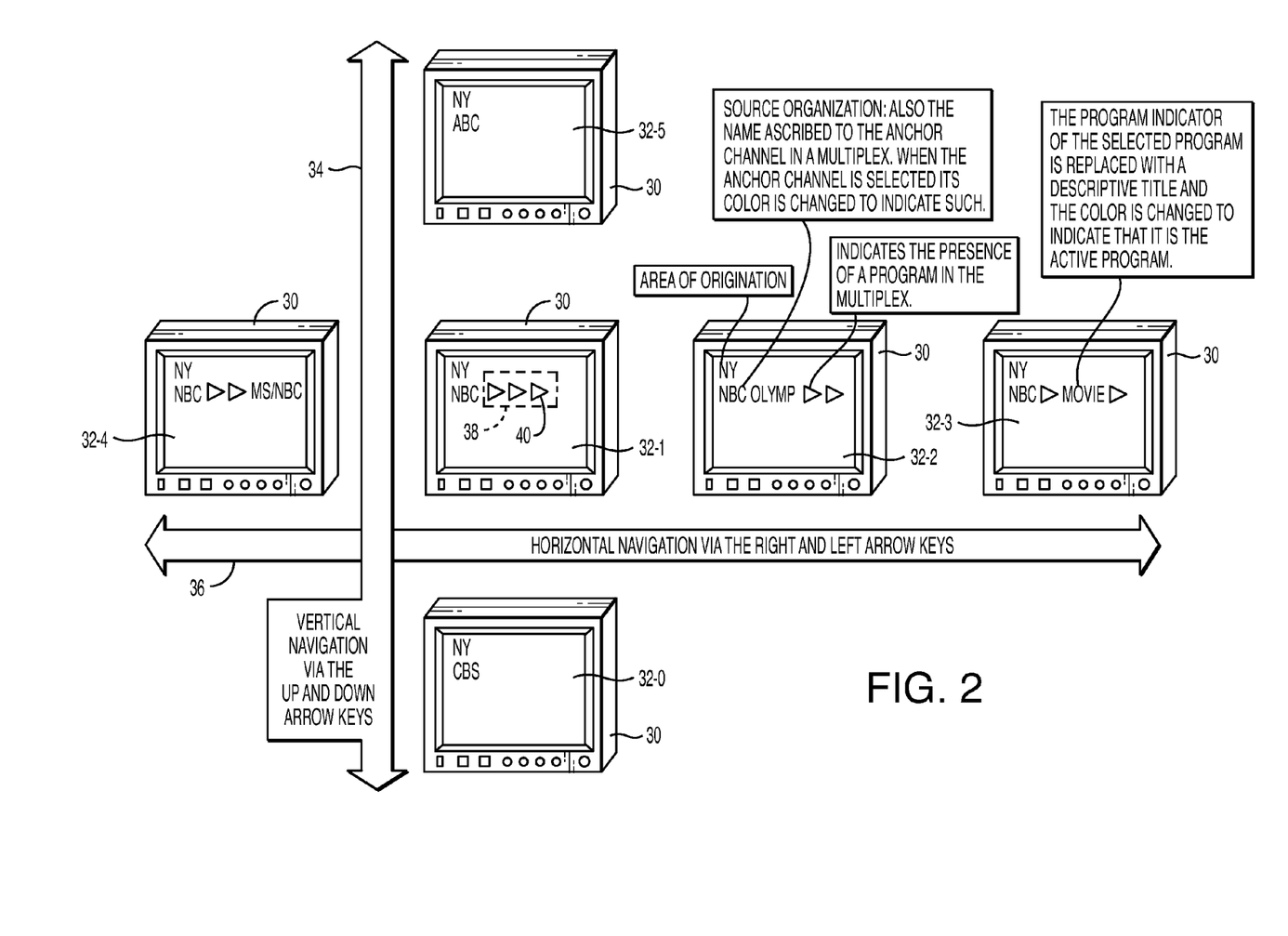
FIG. 2 shows on-screen display formats suitable for use in a two-dimensional channel navigation technique in accordance with the invention.

FIG. 2 illustrates the two-dimensional channel navigation of the invention in greater detail. In this example, a television receiver 30 is shown with a number of different displays 32-$i$, i=0, 1, . . . 5, generated in response to viewer commands entered via a remote control or other mechanism. The vertical arrow 34 corresponds to vertical navigation through vertically integrated broadcast providers, using channel up or down keys, and the horizontal arrow 36 corresponds to horizontal navigation through the multiplex channels of a single broadcast provider. The on-screen channel displays in this example include two lines of information. The first line, which could be made optional, indicates the geographic location of the particular broadcast provider. This information is useful in differentiating the broadcast provider for customers located in areas in which more than one network affiliate can be received. For example, a receiver in Cherry Hill, N.J. can typically pick up signals from both a New York affiliate and a Philadelphia affiliate. Because a broadcast provider, such as ABC, can have affiliates in two or more markets, the first line of information is used to indicate to the viewer which transmission they are receiving. In the exemplary displays 32-$i$ of FIG. 2, the first line of information in each case specifies "NY" to indicate that the corresponding transmissions are from a New York affiliate. This broadcast provider information is also referred to herein as "area of dominant influence" or ADI.

The second line of information in the on-screen channel displays of FIG. 2 includes an identifier of the broadcast provider, also referred to herein as "source organization." This identifier specifies the anchor channel which is present as a default channel regardless of whether or not the channel is operated as a multiplex or as a single HDTV channel. The anchor channel and its identifier thus serves to preserve the brand identity of the broadcast provider. The identifier may be determined using information in the Program/Episode/Version descriptor and program_id_string field as described in the above-cited ATSC documents. In display 32-0, the broadcast provider is CBS, in displays 32-1 through 32-4 it is NBC and in display 32-5 it is ABC. In the FIG. 2 example, only the broadcast provider NBC is transmitting a multiplex of four channels, while the other broadcast providers CBS and ABC are each transmitting a single HDTV channel. The viewer is made aware of the presence of a multiplex by the presence of a multiplex indicator 38. The multiplex indicator 38 is shown as including a sequence of icons 40, with each of the icons 40 representing a channel of the multiplex which is available beyond the anchor channel. The icons are shown as arrows in FIG. 2, and are designed to remind the viewer that the multiplex channels are accessible through horizontal navigation via the channel right or left keys. Other suitable icons could also be used, including, for example, ■, ✶, ➔or ●. As noted previously, each broadcast provider transmits at least an anchor channel at any given time. The anchor NBC channel will therefore be available to viewers at all times regardless of whether or not NBC is transmitting a multiplex. The fact that there are three icons 40 in the multiplex indicator 38 of display 32-1 tells the viewer that there are three multiplex channels available in addition to the anchor channel.

Each of the icons 40 in multiplex indicator 38 thus serves as a place holder for one of the multiplex channels. In alternative embodiments, the icons 40 could be based on a character set indicative of program content in the multiplex channels. For example, the Olympic symbol could be used to denote a sports channel, a newspaper to denote a news channel, and a cloud or sun to denote a weather channel. Many different variations are possible. In any case, the on-screen display includes an icon for each channel of a multiplex, in addition to the anchor program identifier corresponding to the brand name of the broadcast provider. The viewer navigates through the horizontal channels of the NBC multiplex in FIG. 2 using the channel right or left keys in the manner described in conjunction with FIG. 1. The icons could be downloaded with other program information sent with the broadcast. Alternatively, a fixed character set, either standardized or receiver-vendor selected, could be used to provide the icons.

Color could also be used to indicate to the viewer where they are within a given channel multiplex. For example, when the anchor channel is selected, the color of the broadcast provider identifier may be changed from, for example, a normal color to a highlight color. In addition, when the viewer selects a multiplex channel, the corresponding icon 40 is replaced with a descriptive title. Display 32-1 of FIG. 2 may show the anchor channel and its identifier in a highlight color, with the three icons 40 in a normal color. When the viewer selects display 32-2 by pressing the channel right key on the remote, the icon 40 for the first multiplex channel is replaced with the descriptive title "OLYMP," and the descriptive title may be displayed in the highlight color to indicate that it is the selected channel, while the broadcast provider identifier and the remaining two icons are shown in the normal color. Similarly, the user presses the channel right key again to select the next multiplex channel, and the corresponding icon 40 in display 32-3 is replaced with the descriptive title "MOVIE."

Another press of the channel right key yields the display 32-4, in which the third icon of the multiplex indicator is replaced with the descriptive title "MS/NBC." The display 32-4 is also generated if the viewer presses the channel left key while viewing the display 32-1. The descriptive titles in displays 32-2, 32-3 and 32-4 may each be shown in the highlight color, while the other elements in the second line of information are shown in the normal. Any suitable color pairs, such as black and red, white and red, orange and red, could be used as normal and highlight colors in accordance with the invention. Any number of other techniques could also be used to differentiate the active channels from the other available channels of a multiplex. The descriptive title of a particular channel could be recovered from a corresponding ATSC Program/Episode/Version descriptor and program_id_string field, both of which are described in greater detail in the above-cited ATSC documents. An advantage of the above-described two-dimensional channel navigation techniques is that they can be implemented without using optional portions of these ATSC documents.

Figure 3:
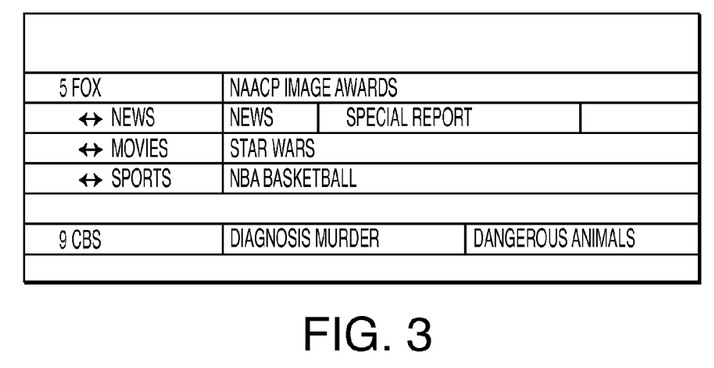
FIG. 3 is an example of an electronic programming guide (EPG) which may be used with channel navigation in accordance with the invention.

Another technique for indicating the presence of multiplex channels may be through the use of an electronic programming guide (EPG). FIG. 3 shows an example of an EPG which is displayed to the viewer when the viewer presses an appropriate key on a remote. The EPG may be used in conjunction with the on-screen display described in conjunction with FIG. 2. In the EPG of FIG. 3, indentation is used to denote the association or grouping of multiplex channels. Here, FOX is transmitting a multiplex of four channels, including an anchor channel and three multiplex channels designated with the descriptive titles "NEWS," "MOVIES," and "SPORTS." The broadcast provider CBS is transmitting a single HDTV channel. As in the case of the icons 40 of the on-screen displays of FIG. 2, the double-ended arrows in the EPG adjacent the FOX multiplex channels are designed to remind the viewer that these channels are accessible through horizontal navigation via the channel right or left keys. Again, more specialized icons could be used in place of the double-ended arrows to more clearly indicate the multiplex channel content. The EPG of FIG. 3 also indicates the programs scheduled for broadcasting over the channels. The association of channels in a multiplex could be implemented using a CIT group as described in the above-cited ATSC documents. Alternatively, channel_PTC and channel_number fields of the CIT could be used in conjunction with a sort routine to provide the association. Because a broadcast provider controls the content in the channel_PTC, by definition the programs are associated, and therefore a first sort key could be the channel_PTC. A secondary sort key could be the channel_number field with the lowest channel number being the anchor channel and the ascending channel numbers the additional channels of the multiplex.

Figure 4:
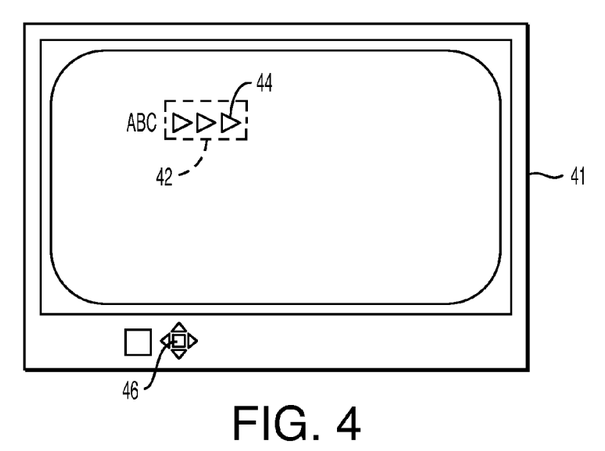
FIGS. 4 and 5 show exemplary minimal implementation displays resulting when a viewer selects an anchor channel and a related multiplex channel, respectively.
Figure 5:
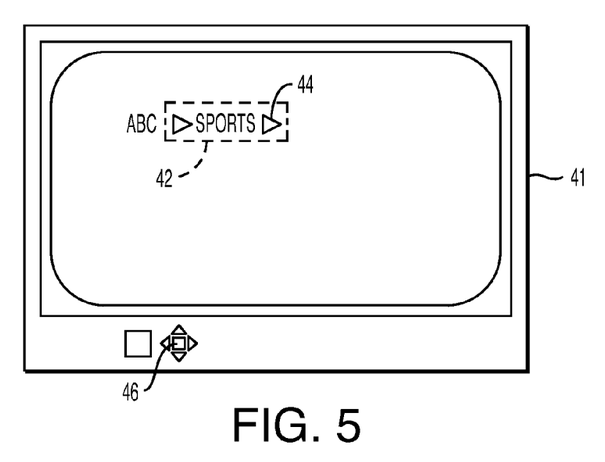

FIGS. 4 and 5 show minimal channel navigation on-screen displays which may be implemented using the non-optional portions of the current ATSC specification as set forth in the above-cited ATSC references. In this example, the on-screen display on a television receiver 41 in FIG. 4 includes a single line of information with an anchor channel identifier, ABC, and a multiplex indicator in the form of a series of arrow icons 44. The multiplex indicator 42 tells the viewer that ABC is transmitting a multiplex of four channels, including the anchor channel and three additional multiplex channels. The receiver 41 includes a channel selection device 46 which includes channel up and down keys as well as channel left and right keys. The viewer can thus navigate in two dimensions through multiplex channel offerings using the channel selection device 46. FIG. 5 shows the second icon of the multiplex indicator 42 replaced with a descriptive title indicative of the current programming, "SPORTS," available on the second multiplex channel from the ABC broadcast provider. The viewer receives the display of FIG. 5 after pressing the channel right key twice. As noted previously, the anchor program identifier and the descriptive title of a particular multiplex channel can be derived from the Program/Episode/Version descriptor and the program_id_string field of the current ATSC standard.

Figure 6A:
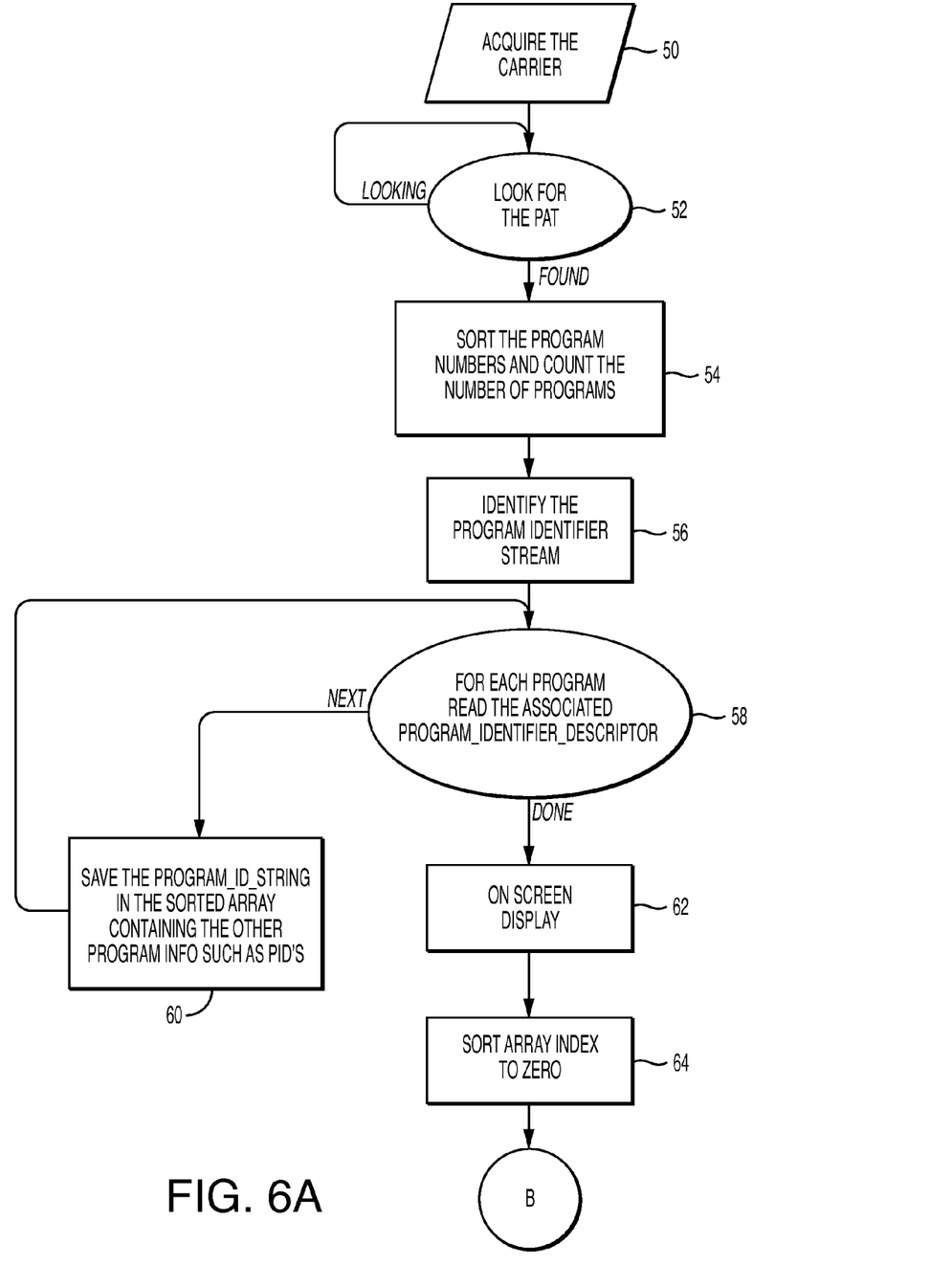
FIGS. 6A and 6B show a flow diagram of a two-dimensional channel navigation process in accordance with the invention.
Figure 6B:
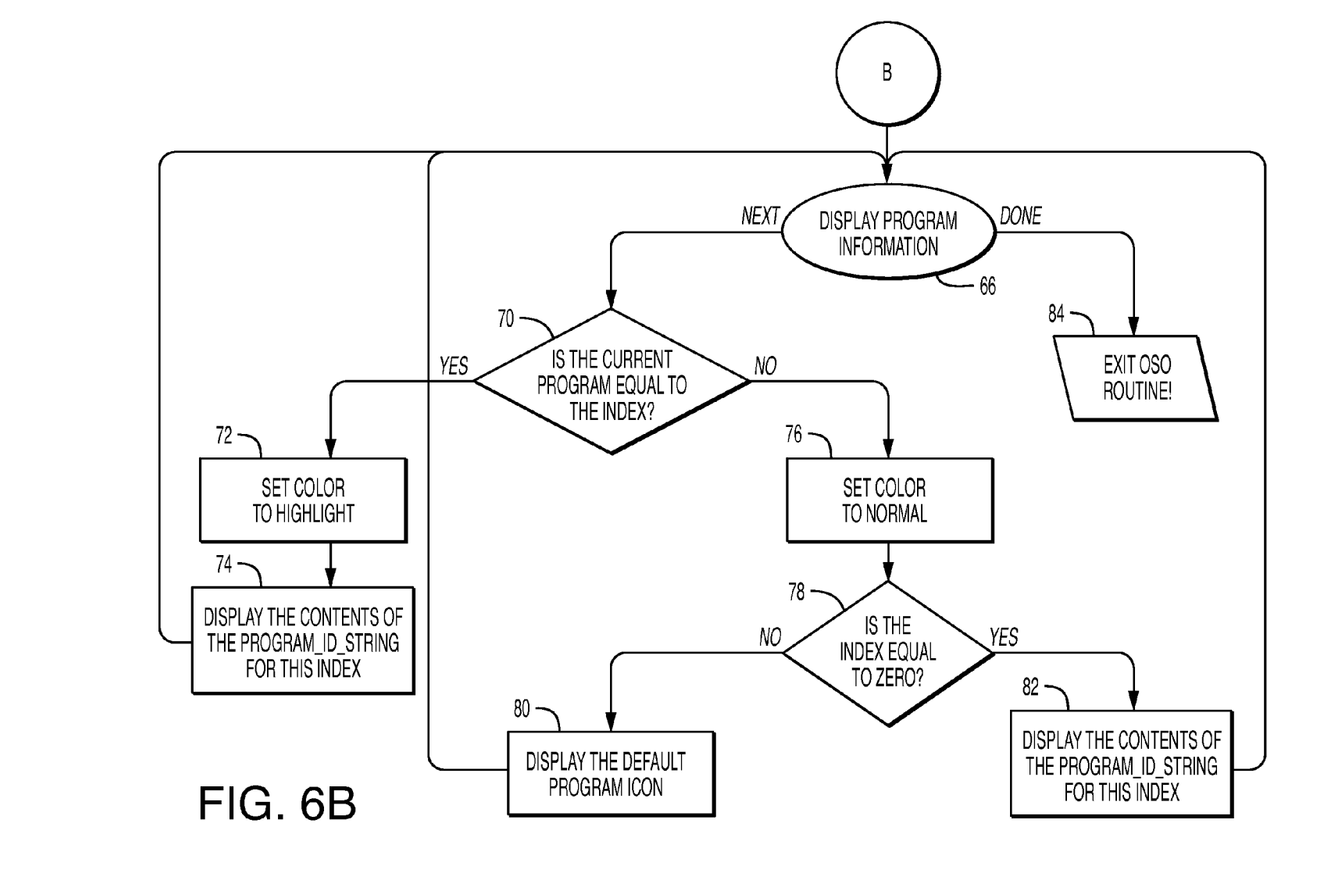

FIGS. 6A and 6B illustrate the process of generating the exemplary on-screen displays of FIGS. 4 and 5. In step 50 of FIG. 6A, a receiver acquires the transmission carrier of a particular anchor channel. The receiver then monitors the demodulated program information looking for a Program Association Table (PAT), as shown in step 52. After the PAT is recovered, the receiver in step 54 sorts the program numbers in ascending order and counts the programs. Alternatively, broadcast providers may be required to send the program information in the PAT in ascending order, such that the receiver does not need to perform a sort operation. In this case, the first program number encountered in the PAT would correspond to the anchor channel program. In steps 56 and 58, the receiver identifies the Program Identifier Stream, reads the program_identifier descriptor associated with each program in the multiplex, and stores the program_id_string from each of the program_identifier_descriptors. The program_id_strings are stored in the form of a sorted array which contains the names and program identifiers (PIDs) of all programs in the multiplex. The array may be in presentation order with the zero element of the array corresponding to the program of the anchor channel. When the viewer requests an on-screen display, as shown in step 62, the receiver sets the array index to zero in step 64, and makes a pass through the stored array to determine which channel of the multiplex is currently being displayed to the viewer.

Referring to FIG. 6B, the receiver begins the process of displaying program information in step 66. In step 70, the receiver determines whether the current program channel being displayed to the user has an index which corresponds to the current array index. If it does, the color of its icon in the on-screen display is set to a highlight color in step 72, the contents of the program_id_string for this index are displayed in step 74, and the process returns to step 66 to process the next channel selection. If the current channel being displayed to the viewer is not equal to the array index in step 70, the color of its icon in the on-screen display is set to normal in step 76, and a determination is made in step 78 as to whether the array index of the current program channel is equal to zero, indicating that the anchor channel is currently being displayed to the viewer. If it is, the contents of the program_id_string for the anchor program identifier is displayed in step 80, and the process returns to step 66 to process further channel selections. If step 78 determines that the array index of the current channel is not equal to zero, the default multiplex icon is displayed in step 80, and the process returns to step 66. When the display of program information is complete for a given requested on-screen display, the on-screen display routine of FIG. 6B is exited. The on-screen display routine is called again each time the viewer presses a channel up or down key or a channel left or right key. It should be noted that alternative embodiments of the invention may utilize other information to enhance the on-screen display. For example, the ISO MPEG Standards Group is in the process of approving Transport Stream Descriptors, which are descriptors that apply to all programs in a given MPEG transport stream. These descriptors are expected to appear in the above-noted PAT, and could be used as ADI descriptors to identify the geographic area of a broadcast provider as part of the exemplary on-screen display described in conjunction with FIG. 2 above. Such an ADI descriptor would also be useful for other purposes, such as determining and controlling blackouts of certain programs in certain areas.

Figure 7:
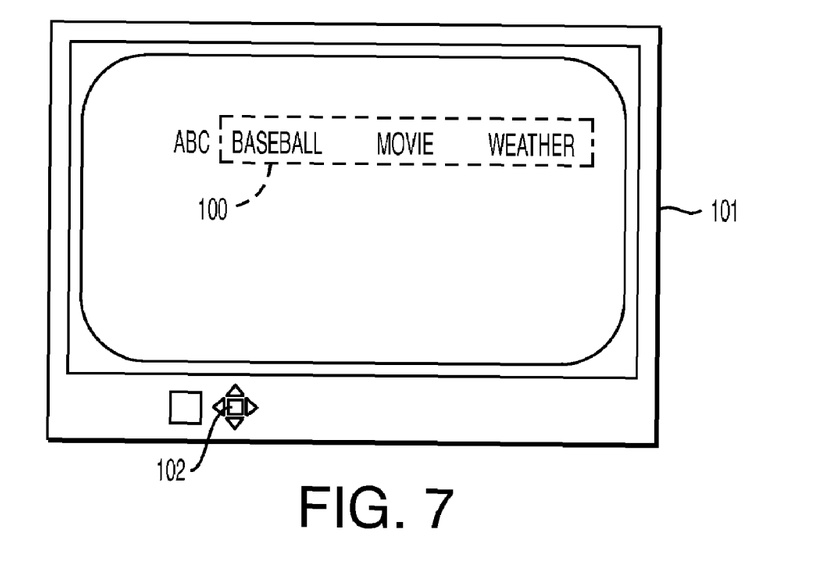
FIGS. 7 and 8 show examples of a text-only on-screen display and a custom icon on-screen display, respectively.
Figure 8:
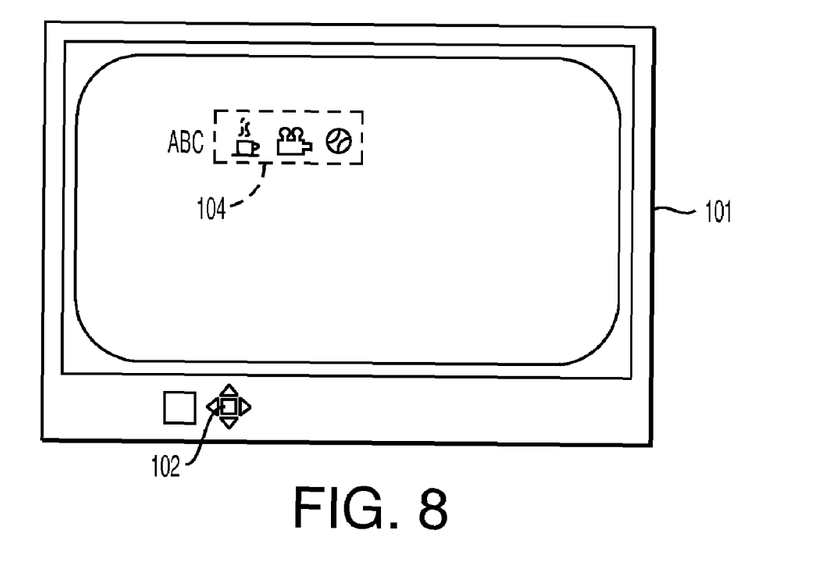

FIGS. 7 and 8 show alternative on-screen displays in accordance with the invention. FIG. 7 shows a text-only on-screen display which includes an anchor channel identifier, ABC, and a multiplex indicator 100 which includes three descriptive titles of three multiplex channels. The display is shown on a television receiver 101 which includes a channel selection device 102 having channel up and down keys as well as channel left and right keys. As in the previous embodiments, the viewer navigates in two dimensions through multiplex channel offerings using the channel selection device 102 or a similar device on a corresponding remote control. The on-screen display of FIG. 7 may be particularly well-suited for HDTV receivers due to the high resolution of such receivers. The descriptive titles could be generated from each program_id_string in a manner similar to that previously described. Older NTSC receivers would generally have a more difficult time displaying this text due to the lower resolution and interlaced display.

Although embodiments of the invention may be configured to download custom icons for each multiplex, such an approach may be undesirable in certain applications due to its potential for introducing latency. More particularly, each time a carrier is acquired, the receiver would have to wait for the picture icons before providing the on-screen display. Better performance may be achieved by having all broadcast providers utilize a standard set of generic icons. This would both speed the display generation process and require the viewer to become familiar with only a limited set of icons. Downloaded icons could in some cases provide reduced clarity by creating a practically infinite set of symbols that viewers would need to learn. An industry-defined set of icons thus has the advantages of being fast, less complex, less expensive, and easier for viewers to become familiar with.

FIG. 8 shows an exemplary on-screen display based on an industry-defined set of icons. In this example, the on-screen display includes an anchor channel identifier, ABC, and a multiplex identifier 104 having a series of three icons. The three icons are indicative of the programming available on the three multiplex channels accessible from the displayed anchor channel. The first of the three icons, a cup of coffee, indicates that the first multiplex channel is a morning show. Similarly, the second icon, a movie camera, indicates that the second multiplex channel is a movie, and the third icon, a baseball, indicates that the third multiplex channel is a baseball game. As in the previous embodiments described above, different colors may be used in the on-screen display to differentiate a selected anchor or multiplex channel from the remaining channels. An industry-defined set of icons such as those shown in FIG. 8 may be implemented by providing an symbol index reference for each program. The symbol index references could be stored using the above-noted program_identifier_descriptor. The addition of a single 8-bit field would provide a 256-symbol library. If each symbol was implemented as a 16×16 pixel matrix, then the entire symbol library could be stored in 8192 bytes.

The above-described embodiments of the invention are intended to be illustrative only. Numerous alternative embodiments may be devised by those skilled in the art without departing from the scope of the following claims.

What is claimed is:

1. An apparatus for providing channel selection, the apparatus comprising:
   a receiver operative to receive a plurality of channels, at least one of the channels being an anchor channel having at least one multiplexed channel associated therewith;
   the receiver configured to superimpose selectively an indication over a display of a channel of the plurality of channels; wherein the indication is operative to indicate whether the channel is an anchor channel;
   a first channel control switch to sequentially navigate the plurality of channels; and
   a second channel control switch to navigate said at least one multiplexed channel.

2. The apparatus of claim 1, further comprising the receiver being operative to display icons representing the content of at least one of the anchor channels or multiplex channels.

3. The apparatus of claim 1, further comprising the receiver being operative to display information reflecting the geographic origination of a channel.

4. The apparatus of claim 1, the receiver being further operative to display an indication of the number of multiplex channels associated with a selected anchor channel.

5. An apparatus for providing channel selection, the apparatus comprising:
   a receiver operative to receive a plurality of anchor channels, with at least one of the anchor channels having at least one multiplexed channel associated therewith, wherein the receiver is further operative to provide an indication whether a selected anchor channel has at least one multiplex channel associated therewith;
   wherein the indication is superimposed over a display of a channel;
   the apparatus configured to receive a first channel control switch signal for sequential navigation of the plurality of anchor channels; and
   the apparatus configured to receive a second channel control switch signal for sequential navigation of the at least one multiplexed channel.

6. The apparatus of claim 5, the receiver being further operative to display icons representing the content of at least one of the anchor channels or multiplex channels.

7. The apparatus of claim 5, the receiver being further operative to display information reflecting the geographic origination of a channel.

8. The apparatus or claim 5, the receiver being further operative to display an indication of the number of multiplex channels associated with a selected anchor channel.

9. A method of providing channel selection, comprising:
   providing a set of channels;
   displaying a first anchor channel from the set of channels when selected;
   providing a first indication that the first anchor channel is an anchor channel;
   superimposing the first indication over the display of the first anchor channel;
   including with the first indication a second indication, wherein the second indication is included when there is at least one multiplex channel associated with the first anchor channel;
   receiving a first command to select from the second indication a first multiplex channel of the at least one multiplex channel associated with the first anchor channel;
   displaying the first multiplex channel;
   providing for the selection of a second anchor channel from the set of channels through the use of a second command of a different type than the first command; and performing at least one of:
switching between multiplex channels associated with an anchor channel from the set of channels using commands of the same type as the first command;
switching between anchor channels from the set of channels using commands of the same type as the second command; and
switching from a multiplex channel associated with one anchor channel from the set of channels to a different anchor channel from the set of channels through a command of the same type as the second command.

10. The method of claim 9 wherein the first indication is at least one icon representing the content of a selected anchor channel from the set of channels, and the second indication is at least one icon representing the content of at least one multiplex channel associated with the selected anchor channel.

11. The method of claim 10 in which the icons are at least one of: industry standard icons transmitted with the channel information and locally generated icons corresponding to the information received from the channel provider.

12. The method of claim 9, further comprising including a descriptor as part of one of the first indication, the second indication, and a third indication, the third indication being superimposed over the display.

13. The method of claim 12, wherein said descriptor indicates the geographic origination of a displayed channel.

14. The method of claim 9, wherein a number of multiplex channels associated with an anchor channel is represented in the second indication by a number of text words or icons displayed.

15. The method of claim 9, further comprising making a channel selection through a remote controller, wherein the remote controller includes a first set of selection mechanisms for selection of adjacent anchor channels and a second set of selection mechanisms for selection of multiplex channels associated with the anchor channels.

16. The method of claim 9, further comprising making channel selection on a receiver of the set of channels, wherein the receiver includes a first set of selection mechanisms for selection of adjacent anchor channels and a second set of selection mechanisms for selection of multiplex channels associated with the anchor channels.

17. A channel selection device for use in selecting channels in a video receiver, comprising:
a channel up key;
a channel down key, the channel up and channel down keys allowing a viewer to select from a plurality of anchor channels supplied from broadcast providers to the receiver; and
at least one horizontal channel selection key for selecting at least one multiplex channel associated with a selected one of the anchor channels;
wherein the at least one horizontal channel selection key includes a channel right key and a channel left key, the channel right key for selecting among a plurality of multiplex channels associated with the selected anchor channel via a movement to the right in a series of icons of an on-screen display, and the channel left key for selecting among the plurality of multiplex channels associated with the selected anchor channel via movement to the left in the series of icons of the on-screen display.

* * * * *